United States Patent
Zhong et al.

(10) Patent No.: US 7,286,511 B2
(45) Date of Patent: Oct. 23, 2007

(54) SYSTEM AND METHOD FOR AN IEEE 802.11 ACCESS POINT TO PREVENT TRAFFIC SUFFERING BAD LINK QUALITY FROM AFFECTING OTHER TRAFFIC

(75) Inventors: Zhun Zhong, Croton on Hudson, NY (US); Marc Portoles, Sant Cugat (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 1098 days.

(21) Appl. No.: 10/289,979

(22) Filed: Nov. 7, 2002

(65) Prior Publication Data

US 2004/0090915 A1    May 13, 2004

(51) Int. Cl.
*H04Q 7/24*    (2006.01)
(52) U.S. Cl. .............. 370/338; 370/395.41; 455/452.2; 455/453
(58) Field of Classification Search ................ 370/338, 370/395.4, 395.41; 455/452.2, 453
See application file for complete search history.

(56) References Cited

U.S. PATENT DOCUMENTS

| 6,240,094 | B1 | 5/2001 | Schneider |
| 6,778,495 | B1* | 8/2004 | Blair .......................... 370/230 |
| 6,865,388 | B2* | 3/2005 | Walsh et al. ................ 455/428 |
| 2002/0188750 | A1* | 12/2002 | Li .............................. 709/235 |

* cited by examiner

*Primary Examiner*—Temica Beamer

(57) ABSTRACT

In a wireless local area network (WLAN), the present invention provides a system and method for identifying traffic suffering from bad link quality and dynamically adjusting channel access to restrict the effect of this bad link quality. The dynamic adjustment to channel access is accomplished by lowering or raising the limit on the number of packets that can be transmitted between an AP and the wireless station over the a link as determined by the link quality. The link quality is determined by tracking the number of successive packet transmission successes and errors.

11 Claims, 3 Drawing Sheets

SYSTEM AND METHOD FOR AN IEEE 802.11 ACCESS POINT TO PREVENT TRAFFIC SUFFERING BAD LINK QUALITY FROM AFFECTING OTHER TRAFFIC

BACKGROUND OF THE INVENTION

1. Field of the Invention

The present invention relates to communications systems. More particularly, the present invention provides a system and method for an IEEE 802.11 Access Point (AP) to prevent traffic suffering bad-link-quality from over occupying the channel and affecting other traffic. Most particularly, in the system and method of the present invention an AP identifies the traffic suffering from bad link quality and dynamically controls channel access to restrict the effect of bad-link-quality in an IEEE 802.11 local area network (LAN) environment.

2. Description of the Related Art

IEEE 802.11 LAN technology is increasingly popular and is becoming the dominant technology in the wireless LAN market. The basic service set (BSS) is the fundamental building block of an IEEE 802.11 LAN. Each BSS consists of at least two stations. Two types of networks are supported: the Infrastructure BSS and the Independent BSS.

In the Infrastructure BSS, stations communicate via a central AP. The central AP receives traffic from a source station and relays it to a destination station. In the Independent BSS, each station communicates with others directly, without the assistance of an AP. Other than traffic forwarding, an AP also provides access to the distribution system (DS), connecting a wireless network with external networks (Ethernet LANs, Internet, etc.). Therefore, the Infrastructure BSS is used to implement enterprise networks that require such connectivity. On the other hand, the Independent BSS can readily be employed to establish an ad hoc network.

A typical Infrastructure BSS is illustrated in FIG. 1, in a BSS of three stations 103 served by an AP 102 that is connected to an Ethernet Switch 101. The wireless stations 103 communicate with one another via the AP 102 and can access resources in a wired external network 100 via the AP 102, which has another interface 101 to the wired external network. In a typical setup, such as illustrated in FIG. 1, the wireless stations 103 can, for example, download files or stream video from the server(s) 100 that are connected to the wired network.

According to the IEEE 802.11 LAN MAC protocol, once a packet has been sent to the wireless media, the sender waits for an acknowledgement from the intended receiver. If the acknowledgement is not received after a certain time has elapsed, i.e., a timeout occurs, the sender assumes that the previous packet did not reach the receiver. The sender retransmits the packet and again waits for an acknowledgement. When no acknowledgement is received, the sender repeats the send-packet/wait-for-acknowledgement procedure until a pre-determined retransmission limit is reached. When this limit is reached, the sender gives up and the transmission is considered to have failed.

A transmission error can occur for a variety of reasons, very often caused by a bad wireless link condition. The link condition can go bad gradually as when a wireless station moves away from an AP, e.g., during handoff. Or, the link condition can go bad all at once, which occurs less commonly, as in the case when the wireless station is terminated abruptly during a transmission. Even when the station is not moving or terminated, the link condition can still fluctuate significantly over a short period of time due to small scale fading of the wireless channel.

In the typical wireless LAN setup, illustrated in FIG. 1, all down stream traffic from the network server(s) 100 to the wireless stations must be forwarded by an AP 102. That is, the AP 102 is responsible for forwarding the traffic from the server(s) 100 to the destination wireless stations and since there is only one wireless media, all traffic addressed to different wireless destination stations must compete for access to the media to reach their destination stations.

If the link between the AP 102 and one of the wireless stations 103 becomes bad, either because the station moves away during handoff or the station is terminated, the AP 102 will not be able to reach the station while trying to deliver a packet. Due to the retransmission policy, however, the AP 102 diligently attempts to deliver the packet and retransmits over and over until a pre-determined retransmission limit is reached. As a result, the effective bandwidth consumed by the bad link increases multi-fold. This increase in bandwidth usage comes at the expense of other traffic whose share of bandwidth decreases correspondingly. The net effect is that the quality of traffic on good links suffers because of the increased traffic on the bad link. Instead of one packet being transmitted, multiple packets are transmitted in a futile attempt to deliver the packet over the bad link.

SUMMARY OF THE INVENTION

Thus, there is a need for a way to reduce the consumption of wireless medium bandwidth by an AP's retransmission of packets over bad links. One possible approach is to dynamically lower the retransmission limit as the link quality degrades, thereby reducing the bandwidth wasted on retries. However, this requires dynamically setting the retransmission limit for each destination station and is not currently supported by the IEEE 802.11 MAC standard. The present invention provides an apparatus and method that restricts traffic on a bad link at the driver level 301 of the wireless interface 300, illustrated in FIG. 3, without requiring any change to the underlying IEEE 802.11 LAN transmission protocol. The system and method of the present invention sets an upper limit per destination station on the maximum number of packets that can be buffered by the network interface driver transmit queue, e.g., 304 and thereby achieves an upper limit on the number of packets that can exist in this device, i.e., card 302, that are competing for the wireless medium.

The present invention puts a per-destination limit on the number of packets the driver can pass to the network interface device 302, which in a preferred embodiment is a network interface card 302. When a link goes bad, the AP observes transmission failure and this restriction is tightened on this link by lowering the limit for this particular destination. Once the link recovers, the AP observes transmission success and this restriction is relaxed by increasing the limit for this particular destination. In this way, the system and method of the present invention the network driver 301 of the network interface 300 dynamically controls the flow of packets into the network interface device 302, limiting the packets addressed to a station having a bad link and thereby reducing the effect of one bad link on other traffic competing for bandwidth over the wireless medium and controlled by the same AP.

DETAILED DESCRIPTION OF THE INVENTION

The present invention is a system and method for reducing the impact of bad links between an AP and wireless stations on other traffic competing for bandwidth over the wireless medium by dynamically manipulating the limit on the number of packets that can be queued in the AP for transmission to a given wireless station. If the link between the AP and a station is good, the limit is set to a pre-determined maximum. If the link degrades and a transmission error, this maximum is reduced in a pre-determined way to limit the impact of retransmissions on other traffic being handled by the AP.

Other refinements are provided by the preferred embodiment of the present invention. The preferred embodiment places a limit on the number of consecutive errors that can occur on a link and dissociates a station once that limit is exceeded. Further, if the link keeps going bad during a series of packet transmissions to a wireless station, the system and method of the present invention only allows one packet to be queued for transmission until the link is consistently good.

Figure 1:
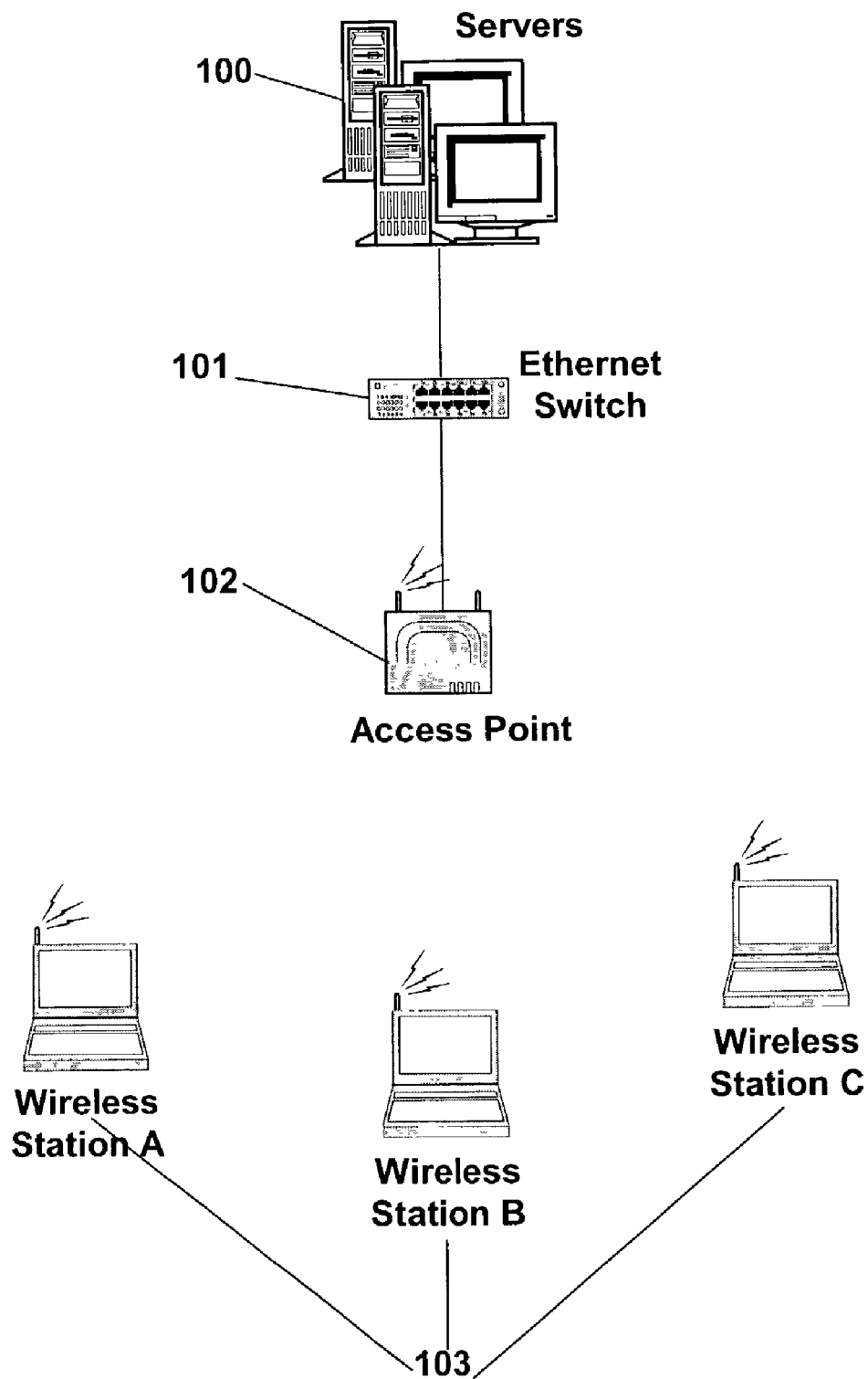
FIG. 1 illustrates a typical wireless local area network WLAN for an Infrastructure BSS connected to an external network.
Figure 2:
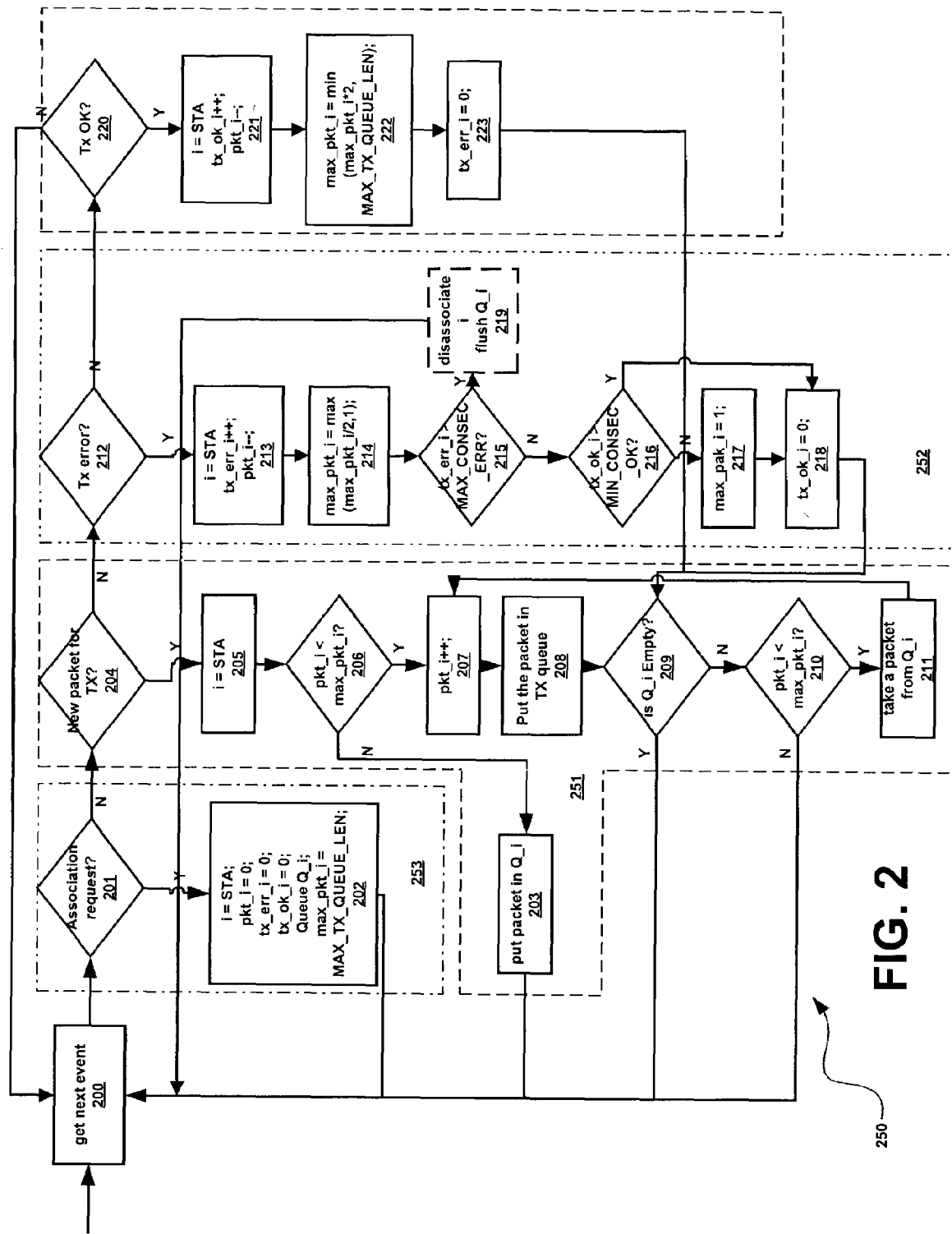
FIG. 2 is a flow diagram of a preferred embodiment of the present invention.
Figure 3:
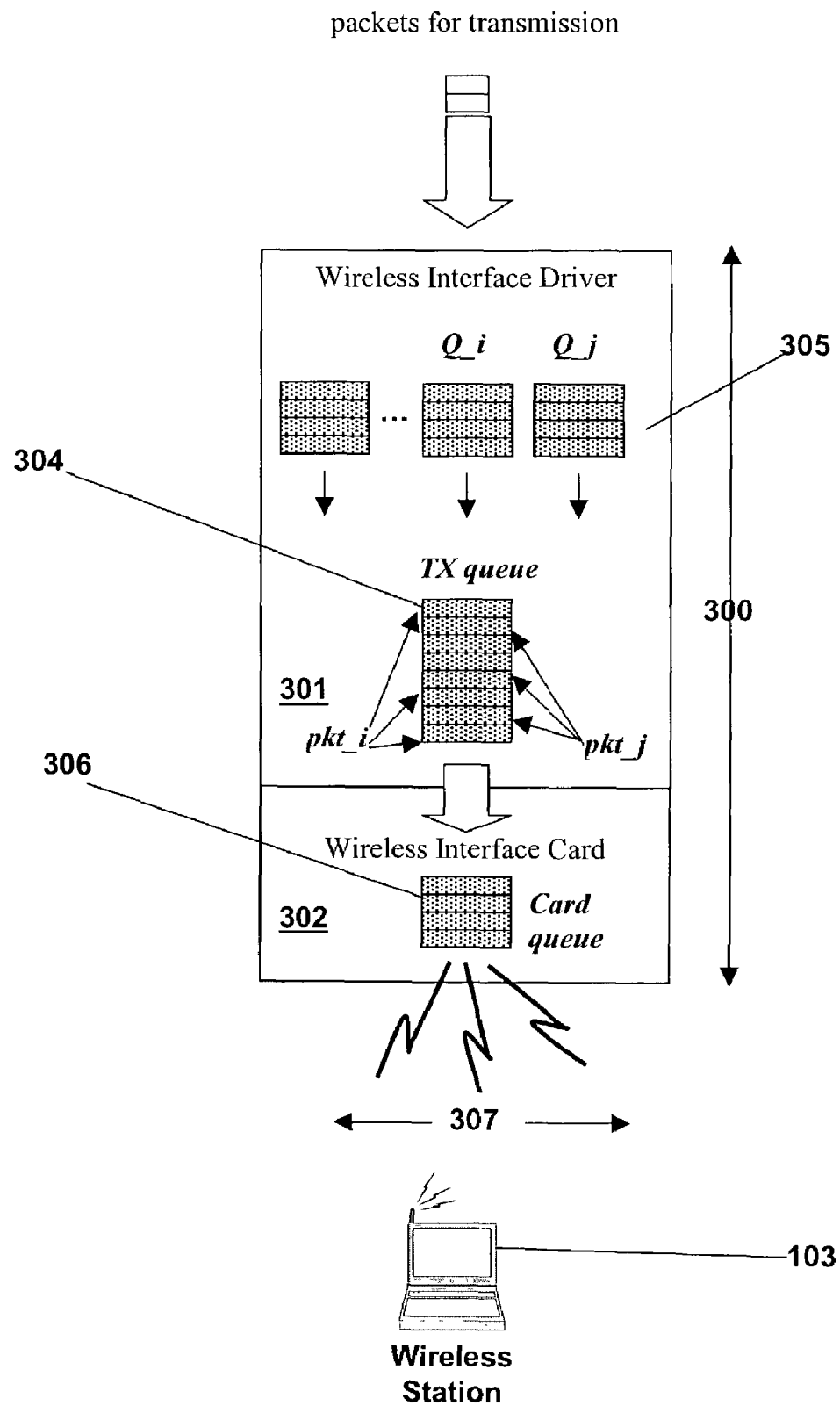
FIG. 3 illustrates a wireless interface of an AP according to the present invention.

FIG. 2 is a flow of the logic of a preferred embodiment of the system and method of the present invention and FIG. 3 shows a preferred system for implementing this logic in the wireless driver of a wireless interface 300 of an AP 103. The wireless interface 300 comprises a wireless interface driver 301 interfaced to a wireless interface card 302. In the preferred embodiment, the wireless interface driver has an active queue for each active station i, j, . . . (Q_i 305 for station i, Q_j for station j, . . . ) and a shared TX queue 304 for holding a number of packets pkt_i+pkt_j+ . . . for all stations i, j, . . . that are waiting to be passed to the wireless interface card for transmission to station i. In this preferred embodiment, the system and method of the present invention begins at any point in time by obtaining the next event to process at step 200, determining the type of event and taking an appropriate action as follows:

1. If the event is a request for association with a wireless station STA at step 201, the parameters of wireless station i=STA are initialized at step 202, in particular setting the maximum number of packets max_pkt_i (that can be entered in TX queue 304 for station i to be passed to the wireless device 302 for transmission to the wireless station STA) to a predetermined value of MAX_TX_QUEUE_LEN and initializing an empty queue Q_i 304 for holding station i's packets when the maximum number that can be entered into the TX queue 304 for station i has been reached, i.e., a queue Q_i 304 for holding packets waiting to be placed into the TX queue 304 to await being passed to the device 302 for transmission to the station i. The next event is then obtained at step 200 and the process repeats.

2. If the event is a request for transmission of a new packet at step 204, the active station index i is set to wireless station STA at step 205 and if the number of station i's packets already placed into the TX queue 304 waiting to be passed to the device 302 is greater than or equal to max_pkt_i at step 206, the packet is queued in Q_i 304 at step 203. The next event is then obtained at step 200 and the process repeats. If the number of station i's packets already placed into the TX queue 304 waiting to be passed to the device 302 is less than max_pkt_i at step 206, 2a. the number of packets placed by station i into the TX queue 304 and waiting to be passed to the device 302 for transmission to station i is incremented by one at step 207, the packet is entered into the transmission queue TX 304 at step 208 and 2b. the number of packets waiting in Q_i to be placed into the TX queue 304 is checked at step 209. If there are no packets waiting to be placed into the TX queue 304, the next event is then obtained at step 200 and the process repeats. However, if there are packets for station i waiting to be placed in the TX queue 304, the number of station i's packets waiting in the TX queue 304 for passing to the device 302 for transmission to a station is checked against the dynamically set max_pkt_i at step 210 and if the maximum has not been reached a packet is dequeued at step 211 from Q_i and stage 2a above is performed with the dequeued packet. If the number of station i's packets waiting in the TX queue 304 for passing to the device 302 for transmission is at the maximum (i.e., equal to max_pkt_i) as checked at step 210, the next event is then obtained at step 200 and the process repeats. In this way the system and method of the present invention queues packets in individual Q_i queues for each station i in the driver 301 before passing them to the TX queue 304 to await transmission once the station i has queued a dynamically set maximum number of packets max_pkt_i to await being passed to the device 302 for transmission. Packets are removed at step 211 from the queue Q_i 305 and passed to the TX queue 304 to await transmission once there is room in the TX queue 304 for station i's packets, as determined at step 210. Each station has a dynamically set maximum number of packets max_pkt_i that can be in the TX queue 304 at any given time. Once this maximum number has been exceeded, packets for station i are queued in Q_i 305 of which there is one such queue for each station.

3. If the event is a transmission error at step 212, the number of consecutive transmission errors tx_err_i for this station i=STA is incremented by one, the number of packets pkt_i 303 already in the TX queue 304, is decremented by one at step 213 because the packet has been transmitted and the maximum number of packets that can be placed into TX queue 304, max_pkt_i, is dynamically reset to half the size of the previous maximum number for this station or to one (in case the maximum value was already one) at step 214. The number of consecutive transmission errors tx_err_i is checked to see if a pre-determined maximum for this parameter MAX_CONSEC_ERR has been exceeded at step 215 and, if so, the station i=STA is dissociated and the queue Q_i 304 is flushed at step 219 and the next event is then obtained at step 200 and the process repeats. If the maximum number of consecutive transmission errors tx_err_i does not exceed a predetermined maximum MAX_CONSEC_ERR at step 215, then the number of successful transmissions tx_ok_i is checked to see if a pre-determined minimum number of consecutive successful transmissions MIN_CONSEC_OK has been exceeded at step 216 and, if not, the maximum number of packets that can be place into the TX queue for station i, max_pkt_i, is set to one at step 217 and in either case the number of consecutive successfully transmitted packets tx_ok_i is set to zero at step 218 and stage 2b above is performed.

4. If the event is a successful transmission at step 220, the number of consecutive successful transmissions tx_ok_i is incremented for station i=STA and the number pkt_i of stations i's packets in the TX queue 304, is decremented by one at step 221 to reflect that a packet has been successfully transmitted and one more position has been opened up in the TX queue for packet for station i. Then the maximum number of packets max_pkt_i that can placed in TX queue 305 for station i, is dynamically set to the minimum of twice the previous value for this maximum number of packets and the predetermined value MAX_TX_QUEUE_LEN at step 222 (so that this value never exceeds MAX_TX_QUEUE_LEN). Finally the number of consecutive packet transmission errors tx_err_i is set to zero at step 223 and stage 2b above is performed. Otherwise the event is not recognized and the next event is obtained at step 200 and the process repeats.

Although a preferred embodiment has been presented, discussed above and illustrated in FIG. 2, this is by way of illustration of a best mode only. Those skilled in the art will realize that the dynamic setting of the maximum number of packets transmitted to a station based on the condition of the link can be accomplished in other ways to control the bandwidth used by a bad link between an AP and a wireless station so as to minimize the impact of retransmission on other traffic competing for this bandwidth. The illustrative example is not set forth in any limiting sense but only as the best mode known then currently known to the inventors. Obviously, many modifications and variation of the present invention are possible in light of the above teachings. It is therefore to be understood that, within the scope of the appended claims, the invention may be practiced otherwise than specifically described.

We claim:

1. A packet traffic throttling unit for managing a volume of packet traffic transmitted on a link between a wireless station of a wireless local area network (WLAN) and an AP, the AP controlling links of a plurality of wireless stations competing for the same bandwidth, said throttling unit comprising:

a packet transmission determination module adapted to regulate the volume of packet traffic on the link between the AP and the wireless station based on an allowable volume of packet traffic between the AP and the wireless station; and a transmission status processing module comprising a first adaptation to adjust the allowable volume of packet traffic between the AP and the wireless station based on a status of packet transmission between the AP and the wireless station, wherein, the status is used by the transmission status processing module to respectively adjust, within pre-determined lower and upper limits, the allowable volume of packet traffic on the link to reduce the effective bandwidth consumed by the link when it has an error status and to increase the effective bandwidth consumed by the link when it has a success status, thereby reducing the effect of the link when it has an error status on links controlled by the AP of the plurality of wireless stations competing for same bandwidth.

2. The packet traffic throttling unit of claim 1, further comprising:

an association module adapted to associate the wireless station with the AP and to initialize the allowable volume of packet traffic between the AP and the station to a pre-determined maximum value;

a shared transmission queue for queueing a number of packets therein by said packet transmission determination module up to the allowable volume of packet traffic between the AP and the station; and a station-specific holding queue for queueing therein by said packet transmission determination module a packet which cannot be queued in said shared transmission queue and de-queueing therefrom and queueing in said shared transmission queue by said packet transmission determination module a packet whenever said allowable volume of packet traffic between the AP and the station has not been reached, wherein said first adaptation of the transmission status processing to adjust the allowable volume of packet traffic, is according to whether the status is success or error, respectively, by increasing the allowable volume up to a first calculated value or by lowering the allowable volume down to a second calculated value.

3. The packet traffic throttling unit of claim 2, wherein said transmission status processing module further comprises a second adaptation to determine a first and second quality measure of the link between the AP and the station as, respectively, the number of consecutive statuses of error and success, to drop the link when the first quality measure exceeds a pre-determined value and to lower the allowable volume to one when the second quality measure is less than a pre-determined value.

4. The packet traffic throttling unit of claim 3, wherein: said second calculated value is the maximum of half the allowable volume and one; and said first calculated value is the minimum of twice the allowable volume and the pre-determined maximum value.

5. The packet traffic throttling unit of claim 2, wherein: said second calculated value is the maximum of half the allowable volume and one; and said first calculated value is the minimum of twice the allowable volume and the pre-determined maximum value.

6. The packet traffic throttling unit of claim 1, further comprising an IEEE 802.11 wireless interface having a wireless interface driver comprising said packet transmission determination module and said transmission status processing module.

7. The packet traffic throttling unit of claim 2, further comprising an IEEE 802.11 wireless interface having a wireless interface driver comprising said packet transmission determination module, said transmission status processing module, said transmission queue, and said station-specific holding queue.

8. The packet traffic throttling unit of claim 3, further comprising an IEEE 802.11 wireless interface having a wireless interface driver comprising said packet transmission determination module, said transmission status processing module, said transmission queue, and said station-specific holding queue.

9. A method for throttling packet traffic transmitted on a link between an access point (AP) and a wireless station of a wireless local area network (WLAN), the AP controlling links of a plurality of wireless stations, said method comprising the steps of:

setting a maximum number of packets that can be queued for transmission by the AP to the wireless station to a pre-determined value;

providing a transmission queue;

providing a holding queue;

queueing of a packet in the transmission queue by an AP for transmission to the wireless station, when the number of packets queued for transmission is less that the maximum number of packets than can be queued;

holding of a packet in the holding queue by an AP to await placement in the transmission queue, when the number of packets queued in the transmission queue is equal to the maximum number of packets than can be queued; when the holding queue is not empty and the number packets queued for transmission is less than the maximum number of packets that can be queued for transmission, transferring a packet to the transmission queue from the holding queue;

determining the quality of the link between the AP and the wireless station as bad or good based on success or error of packet transmission to the wireless station; and adjusting the maximum number of packets that can be queued for transmission by the AP to the wireless station based on the determined quality of the link, wherein bad quality decreases and good quality increases the number of packets that can be queued for transmission, within a respective pre-determined lower and upper limit, such that bad quality on the link does not affect other links controlled by the AP.

10. The method for throttling packet traffic of claim 9, further comprising the steps of:

computing the number of consecutive error transmissions;
computing the number of consecutive success transmissions;
if the number of consecutive error transmissions exceeds a pre-determined maximum, dropping the wireless station; and
if the number of consecutive success transmissions is less than a pre-determined minimum, setting the maximum number of packets that can be queued for transmission to one.

11. The method for throttling packet traffic of claim 9, wherein said adjusting step further comprises the substeps of:

if the link quality is bad, setting the maximum number of packets that can be queued for transmission to the maximum of half the current value of the maximum number of packets that can be queued for transmission and one; and if the link quality if good, setting the maximum number of packets that can be queue for transmission to the minimum of twice the current value of the maximum number of packets that can be queued for transmission and the pre-determined maximum number of packets that can be queued for transmission.

* * * * *